United States Patent [19]

Moe

[11] Patent Number: 5,721,413

[45] Date of Patent: Feb. 24, 1998

[54] METHOD FOR HEATING CLOSELY SPACED PORTIONS OF TWO PIPES

[76] Inventor: Per H. Moe, Amtmann Bangsgate 7, N-3019 Drammen, Norway

[21] Appl. No.: 765,020

[22] PCT Filed: Jun. 28, 1995

[86] PCT No.: PCT/NO95/00115

§ 371 Date: Dec. 13, 1996

§ 102(e) Date: Dec. 13, 1996

[87] PCT Pub. No.: WO96/00628

PCT Pub. Date: Jan. 11, 1996

[30] Foreign Application Priority Data

Jun. 28, 1994 [NO] Norway ................... 942441

[51] Int. Cl.⁶ ........................................ B23K 11/02
[52] U.S. Cl. ...................... 219/61.2; 219/105; 219/611
[58] Field of Search ........................ 219/50, 61.2, 105, 219/611

[56] References Cited

U.S. PATENT DOCUMENTS

| | | | |
|---|---|---|---|
| 2,066,668 | 1/1937 | Bennett | 219/50 |
| 2,478,640 | 8/1949 | Roberds | 219/611 X |
| 2,542,393 | 2/1951 | Chapman | 219/611 |
| 2,604,569 | 7/1952 | Denneen | 219/105 |
| 2,629,805 | 2/1953 | Body | 219/611 |
| 2,686,251 | 8/1954 | Kinn et al. | 219/50 X |
| 2,805,316 | 9/1957 | Chapman | 219/72 |
| 2,892,914 | 6/1959 | Rudd | 219/611 |
| 4,241,284 | 12/1980 | Rudd et al. | 219/61.2 |
| 4,736,084 | 4/1988 | Moe | 219/61.2 |
| 4,947,462 | 8/1990 | Moe | 219/611 |

Primary Examiner—Peter S. Wong
Assistant Examiner—Patrick B. Law
Attorney, Agent, or Firm—Seymour Levine

[57] ABSTRACT

A method for heating pipes with closely spaced end portions that are to be joined by forge welding or the like. Two diametrically opposed contacts are attached to each end portion for supplying high frequency alternating current for resistance heating of the material in the respective end portions. The contacts for one of the pipes being located in close proximity to and substantially in the same axial plane as the contacts for the other pipe. The contacts for one of the pipes are arranged to form an angle ($\alpha$) with juxtaposed contacts of the other pipe so that the projections of the juxtaposed contacts onto the axial plane intersect.

9 Claims, 3 Drawing Sheets

5,721,413

METHOD FOR HEATING CLOSELY SPACED PORTIONS OF TWO PIPES

BACKGROUND OF THE INVENTION

The present invention relates to a method for heating closely spaced end portions of two pipes to joined by forge welding or the like, wherein two diametrically opposed contacts are attached to each end portion, through which contacts each end portion is supplied with high frequency alternating current for resistance heating of the material in the respective end portion, the contacts for one of the pipes being located in close proximity to and in the same axial plane as the contacts for the other pipe.

A method of this type is disclosed in U.S. Pat. No. 4,736,084, which hereby is included by reference. This prior art method is successfully used for joining solid work pieces and thick-walled pipes, the heating current concentrating itself in the material closest to the end surfaces of the pipes due to their close proximity. However, for thin-walled pipes, e.g. made from C/Ni steel, the proximity effect may not be sufficiently high so that the current may leak away from the joint surfaces of the pipes. Furthermore, the contact points or junctions between the pipe end portions and the electrical contacts give rise to a wider heating zone resulting in a colder portion in the joint between the contacts.

SUMMARY OF THE INVENTION

The purpose of the present invention is to improve the method in question so that it may also be used successfully for thin-walled pipes and for materials having high thermal and/or electrical conductivity.

In accordance with the invention, this is achieved by a method as recited in the invention background, the method being characterized in that the contacts for one of the pipes are arranged to form an angle with the contacts for the other pipe, whereby the projections of the contacts onto said axial plane appear to cross each other.

According to an advantageous embodiment of the invention the contacts for one of the pipes are run through slots in the contacts for the other pipe.

In areas of the joint remote from the contact points or junctions the heating current may tend to spread somewhat from the joint surfaces and reduce the rate of heating. To concentrate the current close to the joint also in these areas, it is suggested according to the invention to place ferrite bars parallel to the longitudinal axes of the pipes close to the pipe wall in diametrically opposed areas between the contacts. These ferrite bars may be arranged both on the inside and on the outside of the pipes.

The effect of crossing the contacts increases with increasing angle between the contacts. Consequently, in accordance with the invention, the angle is adjusted in order to avoid overheating of the pipe material between the contacts.

The invention will be described in more detail in the following in conjunction with the exemplifying embodiments shown in the appended drawings, where

DESCRIPTION OF THE PREFERRED EMBODIMENTS

Figure 1:
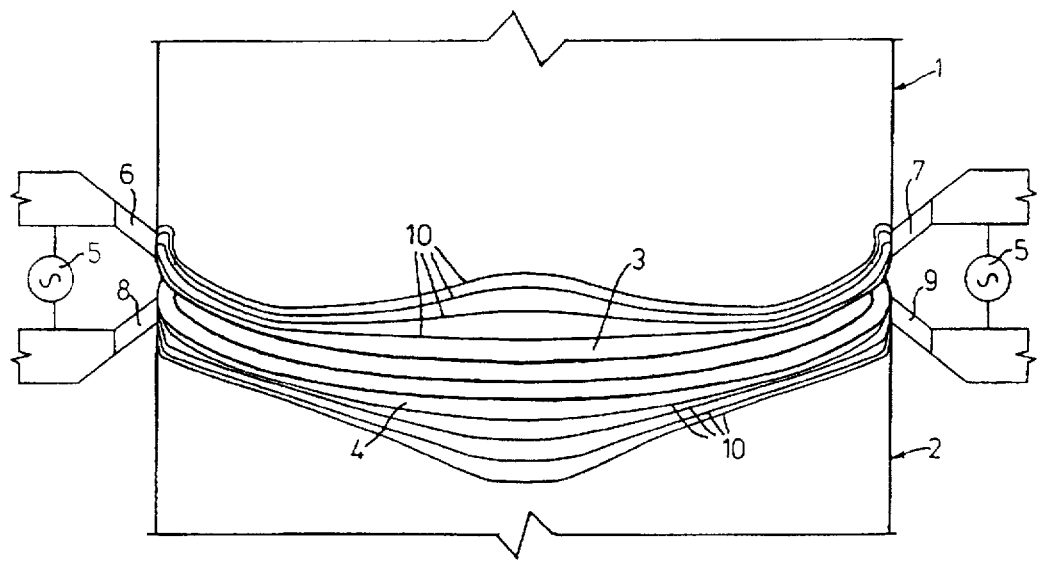
FIG. 1 is a perspective view illustrating a prior art method.

FIG. 1 illustrating a prior art embodiment shows two pipes 1 and 2 having end portions 3 and 4, respectively, to be joined by means of forge welding. Prior to joining the two pipes their end portions 3, 4 are heated by means of a high frequency alternating current supplied by a source 5 through contacts 6, 7 to the upper pipe 1 and 8, 9 to the lower pipe 2.

The current density in the end portions 3, 4 is illustrated by the lines 10. As apparent from these lines, the current is less dense midway between the contacts 6, 7; 8, 9 and also near the junctions between the contacts and the respective pipe end portions. These effects lead to insufficient heating of the middle areas and the material between the contact pairs 6; 8 and 7; 9.

Figure 2:
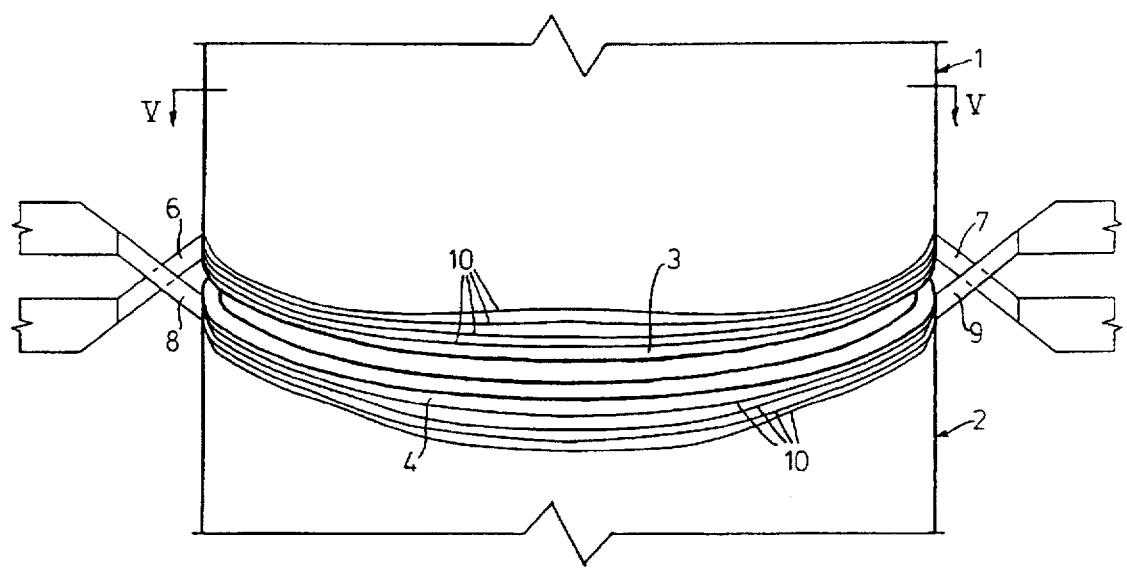
FIG. 2 is a view similar to that in FIG. 1 but illustrating schematically an embodiment of the present invention.
Figure 5:
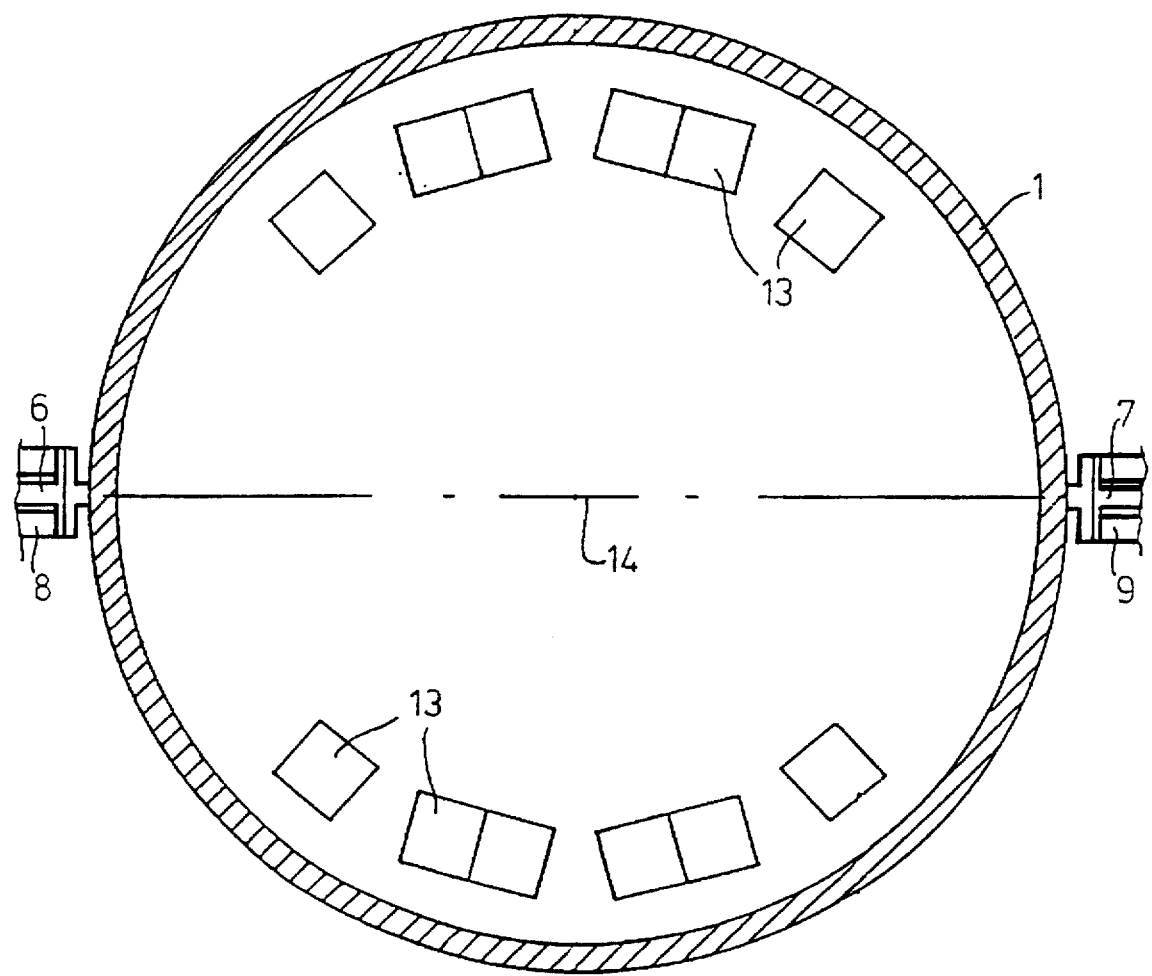
FIG. 5 is a section on the line V—V in FIG. 2.

According to the invention, the contacts 6–9 are rearranged as shown in FIG. 2, i.e. the contacts within each pair 6; 8 and 7; 9 appear to cross each other in the plane of the drawing, which corresponds to an axial plane 14 through the center line of the pipes 1, 2 and the contacts (FIG. 5). As indicated by the current density lines, the problem areas at the contact junctions and the middle areas have greatly improved. At this time it is not fully understood why these beneficial effects occur and therefore no explanation will be attempted here.

Figure 3:
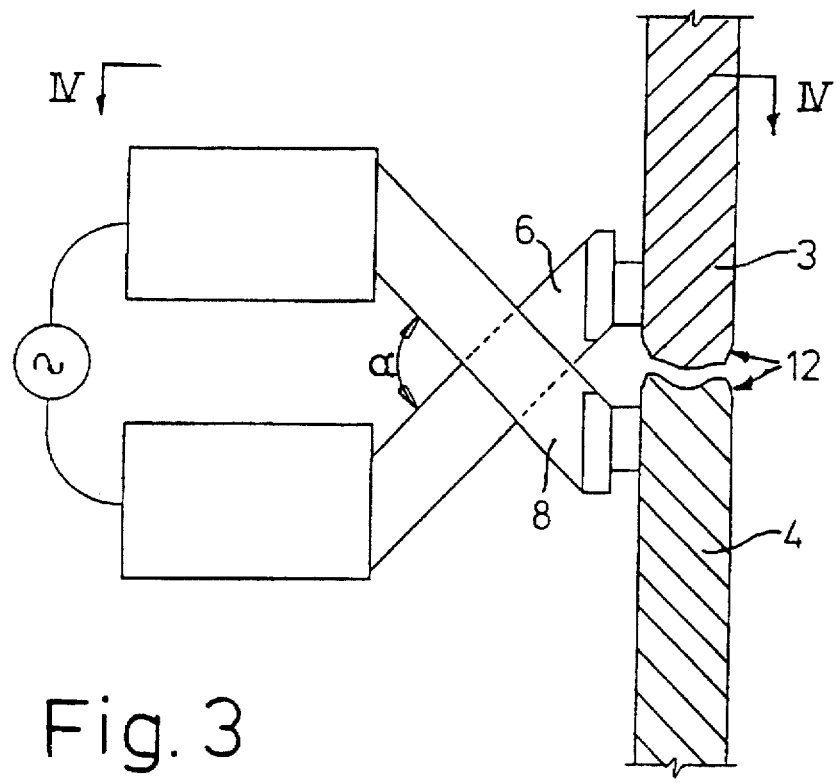
FIG. 3 is an elevation view corresponding to the left part of FIG. 2 showing an alternate embodiment, partly in section along the line III—III in FIG. 4.
Figure 4:
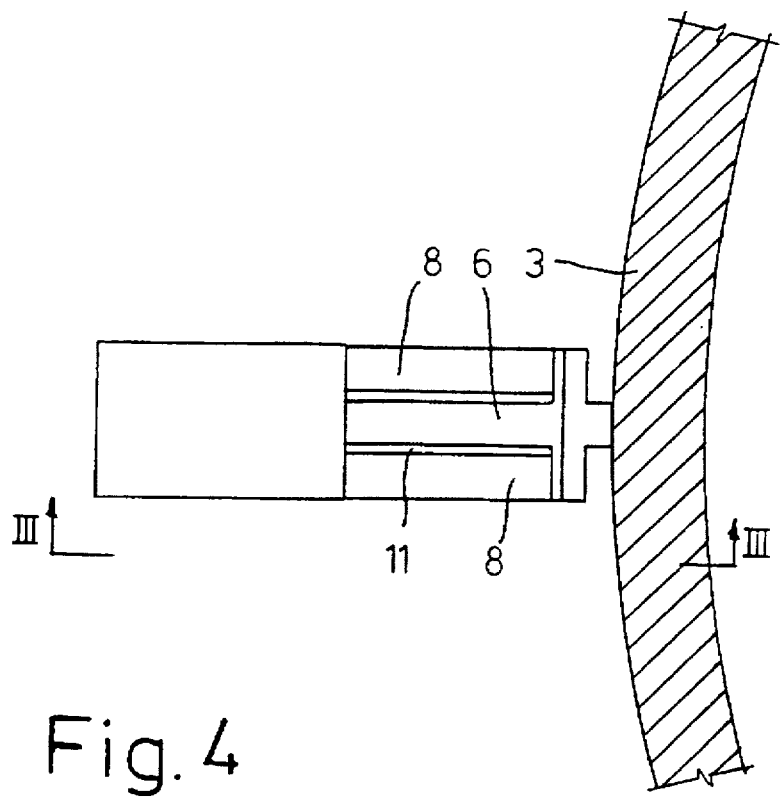
FIG. 4 is a section along the line IV—IV in FIG. 3.

FIGS. 3 and 4 illustrate how the contacts 6 and 8 may be formed to obtain the crossing effect. The contact 8 has two spaced parallel bars forming a slot 11 therebetween through which the contact 6 extends, an angle $\alpha$ being formed between the crossing parts of the contacts. In order to avoid an inadvertent short circuit between the contacts in the crossing area, an insulating material like mica may be placed between the contacts 6 and 8 in the slot 11.

Crossing of the contacts 6, 8 has the effect of improving heating of the zone 12 between the contacts. By increasing the angle $\alpha$ the heating will be intensified and therefore it is necessary to dermine the angle $\alpha$ for each application depending on material composition, pipe thickness and diameter, contact distance and electrical parameters in order to avoid overheating of the zone 12.

It is believed that the close spacing of the pipe portions 3 and 4 give rise to a "proximity effect" that keeps the current density strong near the joint between the pipe portions. However, even with crossing contacts there will be some tendency for the current density to be less midway between the diametrically opposed contacts 6, 7; 8, 9, as illustrated in FIG. 2. This effect may be due to the high magnetic permeability in the steel pipe and steel in tools inside the pipe or a screen around the pipe. In order to keep the current density high also in the areas between the contacts, it is suggested according to the invention to place elongate ferrite bars 13 parallel to the central longitudinal axes of the pipes 1, 2 near the pipe wall in those areas where the current density is to be improved, e.g. as shown in FIG. 5. The ferrite bars 13 are arranged symmetrically about a diametric axial plane 14 through the pipes and contacts 6, 7; 8, 9. Ferrite bars may also be placed on the outside of the pipes 1, 2 instead of, or in addition to, the bars 13 on the inside.

The ferrite bars may consist of ferrite particles sintered in a mass of insulating material. The bars may have a cross-section of about 30×30 mm and a length of about 150 mm, for instance when used for welding pipes of 273 mm external diameter and 12.7 mm thickness. For such pipes, using an electrical effect of 180 kW at 100 V and a frequency of 15000 Hz, the necessary heating for forge welding the pipes to each other may be obtained in about 30 sec.

It will be understood the changes and modifications may be made in the exemplifying embodiments described in the specification and shown in the drawings without departing from the scope of the invention as defined in the following claims.

I claim:

1. A method for heating closely spaced end portions (3,4) of two pipes (1,2) to be joined by forge welding or the like, the pipes (1,2) each having an inside, an outside, a longitudinal axis and a wall, wherein two diametrically opposed contacts (6,7; 8,9) are attached to each end portion, through which contacts each end portion (3,4) is supplied with high frequency alternating current for resistance heating of pipe material in the respective end portion, the contacts (6,7) for one of the pipes (1) being located in close proximity to and substantially in the same axial plane (14) as the contacts (8,9) for the other pipe (2), corresponding contacts (6,8; 7,9) attached to end portions (3,4) being juxtaposed, characterized in that, near the pipes (1,2), the contacts (6,7) for one of the pipes (1) are arranged to form an angle ($\alpha$) with juxtaposed contacts (8,9) of the other pipe (2) so that the projections of the juxtaposed contacts (6,8; 7,9) onto the axial plane (14) intersect.

2. A method according to claim 1, characterized in that the contacts (6,7) for one of the pipes (1) are made to extend through a slot (11) in the contacts (8,9) for the other pipe (2).

3. A method according to claim 2, characterized in that elongate ferrite bars (13) are arranged substantially parallel to the longitudinal axes of the pipes (1,2) near the walls of the pipes in diametrically opposite areas between the contacts (6,7,8,9).

4. A method according to claim 3, characterized in that the ferrite bars (13) are arranged both on the inside and the outside of the pipes (1,2).

5. A method according to claim 3, characterized in that the angle ($\alpha$) formed between the crossing contacts (6,8; 7,9) is adjusted to avoid overheating of the pipe material (12) between the contacts.

6. A method according to claim 2, characterized in that the angle ($\alpha$) formed between the crossing contacts (6,8; 7,9) is adjusted to avoid overheating of the pipe material (12) between the contacts.

7. A method according to claim 1, characterized in that elongate ferrite bars (13) are arranged substantially parallel to the longitudinal axes of the pipes (1,2) near the walls of the pipes in diametrically opposite areas between the contacts (6,7,8,9).

8. A method according to claim 7, characterized in that the ferrite bars (13) are arranged both on the inside and the outside of the pipes (1,2).

9. A method according to claim 1, characterized in that the angle ($\alpha$) formed between the crossing contacts (6,8; 7,9) is adjusted to avoid overheating of the pipe material (12) between the contacts.

* * * * *